United States Patent
Beechie et al.

(10) Patent No.: US 6,188,951 B1
(45) Date of Patent: Feb. 13, 2001

(54) ENGINE FRICTION CHARACTERIZATION

(75) Inventors: Brian E. Beechie, Farmington Hills; Gregory L. Ohl, Ann Arbor; James W. Yip, Pinckney; Michael J. Prucka, Lake Orion, all of MI (US)

(73) Assignee: DaimlerChrysler Corporation, Auburn Hills, MI (US)

( * ) Notice: Under 35 U.S.C. 154(b), the term of this patent shall be extended for 0 days.

(21) Appl. No.: 09/404,552

(22) Filed: Sep. 23, 1999

(51) Int. Cl.$^7$ ............................ G01L 3/00; G01M 15/00
(52) U.S. Cl. .......................... 701/102; 701/115; 73/117.3
(58) Field of Search ................................ 701/101, 102, 701/103, 115; 73/116, 117, 117.3

(56) References Cited

U.S. PATENT DOCUMENTS

| | | | |
|---|---|---|---|
| 4,292,670 | * 9/1981 | Reid et al. | 701/102 |
| 5,151,861 | * 9/1992 | Danno et al. | 701/102 |
| 5,168,449 | 12/1992 | Benford | 701/51 |
| 5,193,062 | * 3/1993 | Murase et al. | 73/117 |
| 5,235,946 | 8/1993 | Fodale et al. | 477/109 |
| 5,377,112 | 12/1994 | Brown, Jr. et al. | 701/115 |
| 5,508,923 | 4/1996 | Ibamoto et al. | 701/70 |
| 5,511,412 | 4/1996 | Campbell et al. | 73/117.3 |
| 5,517,964 | 5/1996 | Chen et al. | 123/339.11 |
| 5,629,852 | * 5/1997 | Yokoyama et al. | 701/101 |
| 5,720,258 | 2/1998 | Tolkacz et al. | 123/352 |
| 6,035,252 | * 3/2000 | Dixon et al. | 701/102 |

* cited by examiner

Primary Examiner—Willis R. Wolfe
(74) Attorney, Agent, or Firm—Mark P. Calcaterra

(57) ABSTRACT

A method for characterizing the friction losses within an internal combustion engine includes determining a start-up friction term, a mechanical friction term, a pumping loss term, and an adapted friction term to compensate for long-term frictional changes in the engine. A total engine frictional loss is determined by summing the start-up friction term, the mechanical friction term, the pumping loss term and the adapted friction term.

13 Claims, 2 Drawing Sheets

ENGINE FRICTION CHARACTERIZATION

BACKGROUND OF THE INVENTION

1. Technical Field

The present invention generally pertains to a system for characterizing the energy losses within an internal combustion engine. More particularly, but without restriction to the particular embodiment and/or use which is shown and described for purposes of illustration, the present invention relates to an engine friction characterization system used in conjunction with a torque based idle control system.

2. Discussion

The internal combustion engine of today's motor vehicle is a complicated, dynamically changing machine. In order to maximize performance and increase component durability, it is desirable to have the capability of controlling an engine to produce a specific output torque. To accomplish this task, an accurate estimate of the energy loss due to friction must be calculated. Characterizing friction within an internal combustion engine requires a very elaborate set of models and equations. However, current engine control processors cannot accommodate this level of complexity. As a result, a simplified approach needs to be developed that not only reduces the amount of processor time required to calculate the frictional losses, but one that also retains much of the original accuracy.

Conventional engine control systems have either completely ignored engine frictional losses or have attempted to incorporate a simple constant percentage loss as part of the model. While these methods have provided some benefit in the past, improvements may be made. Specifically, by using the simplified approach described herein, a characterization of the engine friction loss may be made. Using this data, the engine control unit may accurately estimate the engine's true output torque at any time. A torque management algorithm may be implemented to assure that only the proper level of torque enters the driveline components. Accordingly, it is possible to increase component performance and durability while reducing computer processing overhead. In addition, an accurate estimate of engine output torque is valuable information when utilized by other control systems within the vehicle such as the traction control system and the transmission control system.

SUMMARY OF THE INVENTION

It is therefore an object of the present invention to provide an engine friction characterization in order to estimate and/or control an internal combustion engine to a specific output torque.

It is another object of the present invention to develop a simplified approach of modeling an internal combustion engine resulting in an inexpensive yet accurate control system.

It is yet another object of the present invention to account for both the mechanical frictional losses and the pumping losses within an internal combustion engine.

The present invention relates to a method for characterizing the friction losses within an internal combustion engine. The method includes determining a start-up friction term, determining a mechanical friction term, determining a pumping loss term, determining an adapted friction term to compensate for long-term frictional changes in the engine and determining a total engine frictional loss by summing the start-up friction term, the mechanical friction term, the pumping loss term and the adapted friction term.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
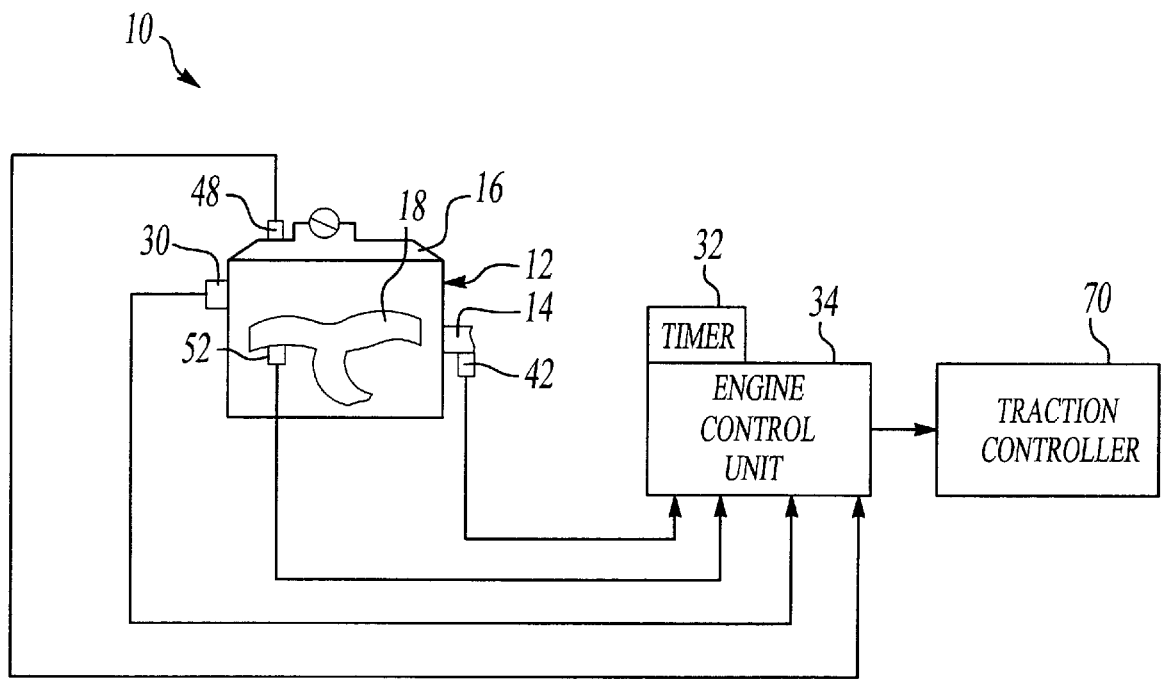
FIG. 1 is a schematic diagram of an exemplary motor vehicle including an engine friction characterization system according to the principles of the present invention.

With initial reference to FIG. 1, a motor vehicle constructed in accordance with the teachings of an embodiment of the present invention is generally identified at reference numeral 10. The motor vehicle 10 includes an engine 12 having an output shaft 14 for supplying power to driveline components and driven wheels (not shown). The engine 12 includes an intake manifold 16 for channeling atmospheric air to the engine's combustion chambers and an exhaust manifold 18 providing a path for the exhaust gasses to escape.

Engine frictional losses can be divided into two major components. The first type of loss, mechanical frictional loss, is generated from a variety of sources including piston to cylinder wall friction, bearing friction, water pump friction and any other interface of moving components. The second type of losses are generally referred to as pumping losses. The pumping losses are a result of pumping air from a low pressure side at intake manifold 16 to a high pressure side at exhaust manifold 18.

In addition to the steady state mechanical frictional losses at each frictional interface previously described, there are energy losses that exist only during the first few seconds of engine running time. For example, the lubricating oil and the engine coolant are initially at rest in the lower extremities of the engine 12. In addition, the lubricant and coolant are oftentimes at a temperature other than the optimum operating temperature. Accordingly, a small of amount time, usually less than one minute, is required for the engine to warm and reach its steady state condition regarding frictional losses.

Finally, account must be made for changes in the nominal engine friction over the lifetime of the vehicle. Component wear, contamination, and lubrication breakdown may change the frictional losses within the engine 12 as the vehicle is operated. An adaptation strategy is utilized to account for the change in engine frictional losses over time. Specifically, the engine adaptation strategy incorporates a definition of zero output shaft torque at the time when the vehicle is at idle and the transmission is in neutral or park. Accordingly, deviation in idle requirements over time indicate a change in the total frictional loss within the engine 12. By slowly adapting the steady state error into the friction adaptation term, the nominal error is reduced to zero.

Figure 2:
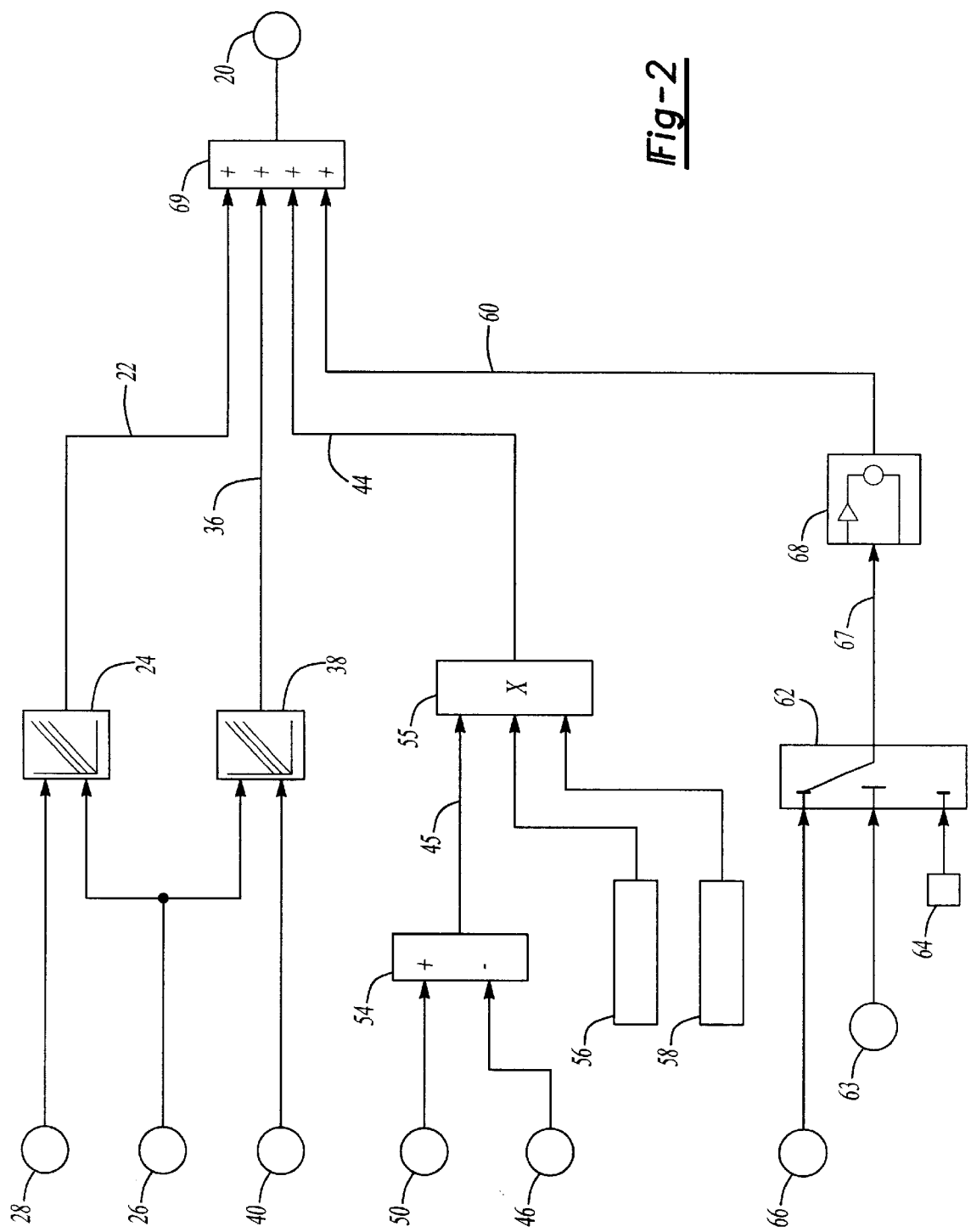
FIG. 2 is a flow diagram representative of the computer program instructions executed by the friction characterization system of the present invention.

Referring to FIG. 2, a total engine frictional loss 20 is shown as the sum of the four previously referenced components, namely, start-up friction, mechanical friction, pumping losses, and adapted friction. Specifically, a start-up friction 22 is characterized by a surface lookup table 24 based on engine coolant temperature 26 and the elapsed time 28 since the engine was started. Referring to FIG. 1, the coolant temperature 26 is determined from a temperature sensor 30 located on engine 12. Similarly, the elapsed time since start 28 is calculated by a timer 32 located within an engine controller 34. The start-up friction surface lookup table 24 is based on empirical data collected at a variety of engine coolant temperatures and elapsed times since starting. As can be understood by one skilled in the art, the magnitude of the startup friction 22 is greatest at a time immediately after starting and diminishes to zero in a relatively short time, usually less than one minute. The start-up friction characterization is an attempt to capture the engine friction losses over and above those present in a steady state condition. Accordingly, the startup frictional loss component is greater than zero for a short time, only during the engine warm-up. One skilled in the art will appreciate that much of the energy loss during this time frame occurs from a lack of lubricant at the upper portion of the engine. Additionally, the rings, pistons and cylinders are cold thereby exhibiting a poor fit between mating parts. Energy is also lost at start-up because the oil and coolant are initially at rest and must be pumped into a state of motion.

Referring to FIG. 2, the second component of the total frictional loss 20 is a mechanical friction loss 36. The mechanical frictional loss 36 comes from a variety of sources, including the piston to cylinder wall interface, the connecting rod to crankshaft interface, oil pump friction, water pump friction and the like. The mechanical friction loss 36 is characterized by a surface lookup table 38 based on an engine rotational speed 40 and the engine coolant temperature 26. As shown in FIG. 1, a rotational speed sensor 42 is operatively associated with engine 12 to provide engine rpm data. One skilled in the art will appreciate that the rotational speed sensor 42 may include a variety of devices capable of determining engine rotational speed. Specifically, an encoder (not shown) outputs electrical pulses every certain number of degrees of rotation of the output shaft 14. The encoder may be used in combination with a timer to determine engine rotational speed 40. One skilled in the art will further appreciate that other methods and mechanisms for determining the engine rotational speed 40 may be implemented without departing from the scope of the present invention.

As noted earlier, the temperature sensor 30 provides coolant temperature data. The mechanical friction surface look up table 38 is created using engine empirical data collected from the engine 12 operating at a variety of engine rotational speeds 40 and coolant temperatures 26. Once the surface look up table 38 has been created, the table is entered into the engine controller 34. The mechanical friction loss 36 is determined by sampling the rotational speed sensor 42 and temperature sensor 30 simultaneously and inputting the data into the surface look up table 38. If the exact values of the engine speed 40 and the coolant temperature 26 are not found in the surface look up table 38, a linear interpolation is performed to calculate the mechanical frictional loss 36.

Referring specifically to FIG. 2, a pumping loss 44 is calculated as the third of four factors summed to calculate the total frictional loss 20 of engine 12. The pumping loss 44 is a result of pumping air from the low pressure side of the engine located at intake manifold 16 to the high pressure side of the engine 12 located at exhaust manifold 18. To obtain a pressure differential 45, an intake manifold pressure 46 measured by an intake manifold pressure sensor 48 is subtracted from an exhaust manifold pressure 50. The exhaust manifold pressure 50 may be measured using an exhaust manifold pressure sensor 52 or may also be characterized as a function of the intake manifold pressure 46, the engine speed 40 and the intake manifold air temperature. Once the pressure drop 45 across the engine 12 has been calculated in block 54, additional mathematical manipulation must occur in block 55 to convert the pressure drop to frictional loss. Specifically, an engine displacement constant 56 and a units conversion factor 58 are multiplied with the pressure drop 45 to determine the pumping loss 44 in units of torque.

The fourth and final component of the total frictional loss of engine 12 is an adapted friction term 60. The adapted friction component 60 incorporates the theory that the engine friction due to the mechanical friction 36 and the pumping losses 44 will change over time. Accordingly, a strategy has been developed to account for any change in friction as the engine components wear. Specifically, the torque emanating from the output shaft 14 is defined as equal to zero when the vehicle is idling and the transmission is in neutral or park. A logic gate 62 is utilized to determine the adapted friction component 60. Accordingly, the logic gate 62 first questions if the idle is stable at location 63.

Stable idle is defined by a number of conditions that must be met. One of the most important conditions is that the engine speed measured by the rotational speed sensor 42 is within close proximity to a target idle rpm initially set. In addition, the air conditioning must have been off for a certain amount of time, the vehicle must have been running for a certain amount of time and the engine coolant temperature 26 must be above a certain value to assure that the engine is warmed up.

If the engine is not at a stable idle condition, the logic gate 62 drops down to accept an input 64 set at zero. If the idle is at a stable condition as defined by the aforementioned factors, the logic gate 62 remains in the position shown in FIG. 2, and an idle position error term 66 becomes an output 67 from the logic gate 62. The output 67 from logic gate 62 is next modified by a function generator 68. If the input to the function generator 68 is zero, the output is also zero and no adapted friction term will be added to the previous adaption term when calculating the total frictional engine loss 20. However, if the idle is stable, the output 67 from the logic gate 62 is the idle position error 66. The idle position error 66 is the difference between the actual torque required to idle the engine and an open loop estimate that the engine controller 34 supplies to try to achieve the target idle speed. Once the idle position error signal 66 is input to the function generator 68 as shown in FIG. 2, the function generator 68 operates to slowly incorporate the idle position error 66 into the friction adaptation term 60, thereby reducing the idle position error 66 to zero over time. For example, if the idle position error 66 is initially equal to 10 and the adapted friction term 60 equals zero, the function generator 68 slowly increases the adapted friction term while simultaneously decreasing the idle position error 66 an equal amount. Therefore, the first modification of the terms by the function generator 68 may reflect only a small change such as the adapted friction term equaling 1 and the idle position error term 66 equaling 9. Because the adapted friction term 60 is intended to account for long term changes in friction of the engine 12, the function generator 68 modifies the adapted friction term very gradually over time until the idle position error 66 equals zero.

Objects of the invention may now be realized once the total frictional loss 20 of engine 12 is calculated by summing each of the start up friction 22, the mechanical friction 36, the pumping loss 44 and the adapted friction 60 in block 69. Specifically, the total engine frictional loss 20 is an input for other programs within engine controller 34 and other vehicle component controllers such as a transmission controller or a traction controller 70 providing a very accurate estimate of torque being input into the remaining drive line components.

Figure 3:
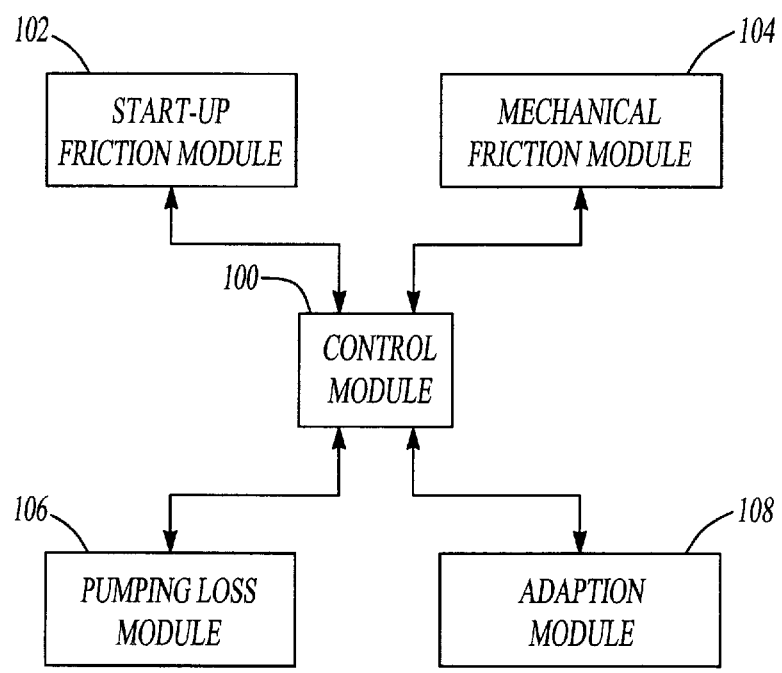
FIG. 3 is a logic diagram showing a graphical representation of the engine friction characterization system of the present invention.

In addition, one skilled in the art will appreciate that the afore-mentioned logical steps may be performed by individual modules in communication with each other as shown in FIG. 3. Control module 100 is in communication with a start-up friction module 102, where the start-up friction 22 is calculated, a mechanical friction module 104, where the mechanical friction 36 is calculated, a pumping loss module 106 where the pumping losses 44 are calculated and an adaptation module 108 where the adapted friction value is calculated.

It is intended that the invention not be limited to the particular embodiment illustrated by the drawings and described in the specification as the best mode presently contemplated for carrying out this invention, but that the invention will include any embodiment falling within the description of the appended claims.

What is claimed:

1. A method for characterizing the friction losses within an internal combustion engine comprising the steps of:

determining a start-up friction term;

determining a mechanical friction term;

determining a pumping loss term;

determining an adapted friction term to compensate for long-term frictional changes in the engine; and determining a total engine frictional loss by summing said start-up friction term, said mechanical friction term, said pumping loss term and said adapted friction term.

2. The method of claim 1 wherein determining a start-up friction term includes collecting a coolant temperature and an elapsed time since start and comparing said coolant temperature and said elapsed time since start to a previously defined look-up table.

3. The method of claim 1 wherein determining a mechanical friction term includes evaluating a coolant temperature and an engine rotational speed.

4. The method of claim 1 wherein determining a pumping loss term includes comparing an intake pressure to an exhaust pressure.

5. The method of claim 1 wherein determining an adapted friction term includes incorporating an idle position error into said total engine frictional loss over time.

6. An engine friction characterization for a motor vehicle comprising:

a control module;

a start-up friction module for determining a start-up friction term, said start-up friction module in communication with said control module;

a mechanical friction module for determining a mechanical friction term, said mechanical friction module in communication with said control module;

a pumping loss module for determining a pumping loss term, said pumping loss module in communication with said control module;

an adaptation module for determining an adaptation term, said adaptation module in communication with said control module, said control module summing said start-up friction term, said mechanical friction term, said pumping loss term and said adaptation term to direct a vehicle control system.

7. The engine friction characterization for a motor vehicle of claim 6 wherein said vehicle control system includes a traction control system.

8. The engine friction characterization for a motor vehicle of claim 6 wherein said pumping loss module compares an intake pressure to an analytically defined exhaust pressure based on an engine speed, an intake air temperature and said intake pressure.

9. A method for characterizing the friction losses within an internal combustion engine comprising the steps of:

determining a mechanical friction term;

determining a pumping loss term; and determining a total engine frictional loss by summing said mechanical friction term and said pumping loss term.

10. The method for characterizing the friction losses within an internal combustion engine of claim 9 wherein the step of determining a pumping loss term includes comparing an exhaust pressure to an intake pressure.

11. The method for characterizing the friction losses within an internal combustion engine of claim 9 further including the step of determining an adapted friction term to compensate for long-term frictional changes in the engine.

12. The method for characterizing the friction losses within an internal combustion engine of claim 9 wherein the step of determining a pumping loss term includes a function based on an engine speed, an intake air temperature and said intake air pressure.

13. The method for characterizing the friction losses within an internal combustion engine of claim 11 wherein the step of determining an adapted friction term includes incrementally decreasing an idle position error term a predetermined amount and incrementally increasing said adapted friction term said predetermined amount over time.

* * * * *